(12) United States Patent
Imai et al.

(10) Patent No.: US 7,489,694 B2
(45) Date of Patent: Feb. 10, 2009

(54) CELL DISASSEMBLY UNIT

(75) Inventors: Hiroshi Imai, Tokyo (JP); Koji Semba, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 375 days.

(21) Appl. No.: 11/494,462

(22) Filed: Jul. 28, 2006

(65) Prior Publication Data

US 2007/0047577 A1    Mar. 1, 2007

Related U.S. Application Data

(62) Division of application No. 10/133,348, filed on Apr. 29, 2002, now Pat. No. 7,116,684.

(30) Foreign Application Priority Data

Jul. 23, 2001    (JP)    ............................. 2001/221079

(51) Int. Cl.
    *H04L 12/56*    (2006.01)
(52) U.S. Cl. ................. 370/395.6; 370/356; 370/395.7; 370/474
(58) Field of Classification Search ................ 370/356, 370/395.6, 395.7, 395, 71, 395.72, 466, 474, 370/476
    See application file for complete search history.

(56) References Cited

U.S. PATENT DOCUMENTS 5,341,376 A * 8/1994 Yamashita ................... 370/466
5,541,926 A * 7/1996 Saito et al. ................... 370/474
5,764,637 A * 6/1998 Nishihara ..................... 370/397
5,848,067 A * 12/1998 Osawa et al. ........... 370/395.61
5,914,954 A    6/1999 Nakayama
5,978,377 A * 11/1999 Kim et al. ............... 370/395.71
6,061,352 A    5/2000 Yamazaki et al.
6,757,288 B1 * 6/2004 Deml et al. ............... 370/395.7
6,826,192 B2   11/2004 Shimamura et al.

FOREIGN PATENT DOCUMENTS

JP    08-191284    7/1996
JP    09-224032    8/1997

* cited by examiner

*Primary Examiner*—Min Jung
(74) *Attorney, Agent, or Firm*—Venable LLP; James R. Burdett

(57) ABSTRACT

The present invention provides a cell disassembly unit which accurately reproduces the position of data on a time axis when ATM cells are converted into STM signals even if cell loss occurs in an ATM network. A cell loss detection circuit disassembles the ATM cells into bytes, sends them to the memory, and detects the number of lost bytes M of the ATM cells. A sequence number generation circuit generates the sequence number N, which is N=N+1 if there is no loss, and N=N+M if there is loss, in the sequence of the transmission of bytes from the cell loss detection circuit. A write address generation circuit generates a write address, and a read address generation circuit generates a read address. A selector sends either the bytes read from the memory or dummy data generated by the dummy data generation circuit to the outside as STM signals. A sequence number confirmation circuit checks the continuity of the sequence numbers N read from the memory, and sends the dummy data insertion signal to the read address generation circuit and the selector if the sequence number has jumped.

2 Claims, 2 Drawing Sheets

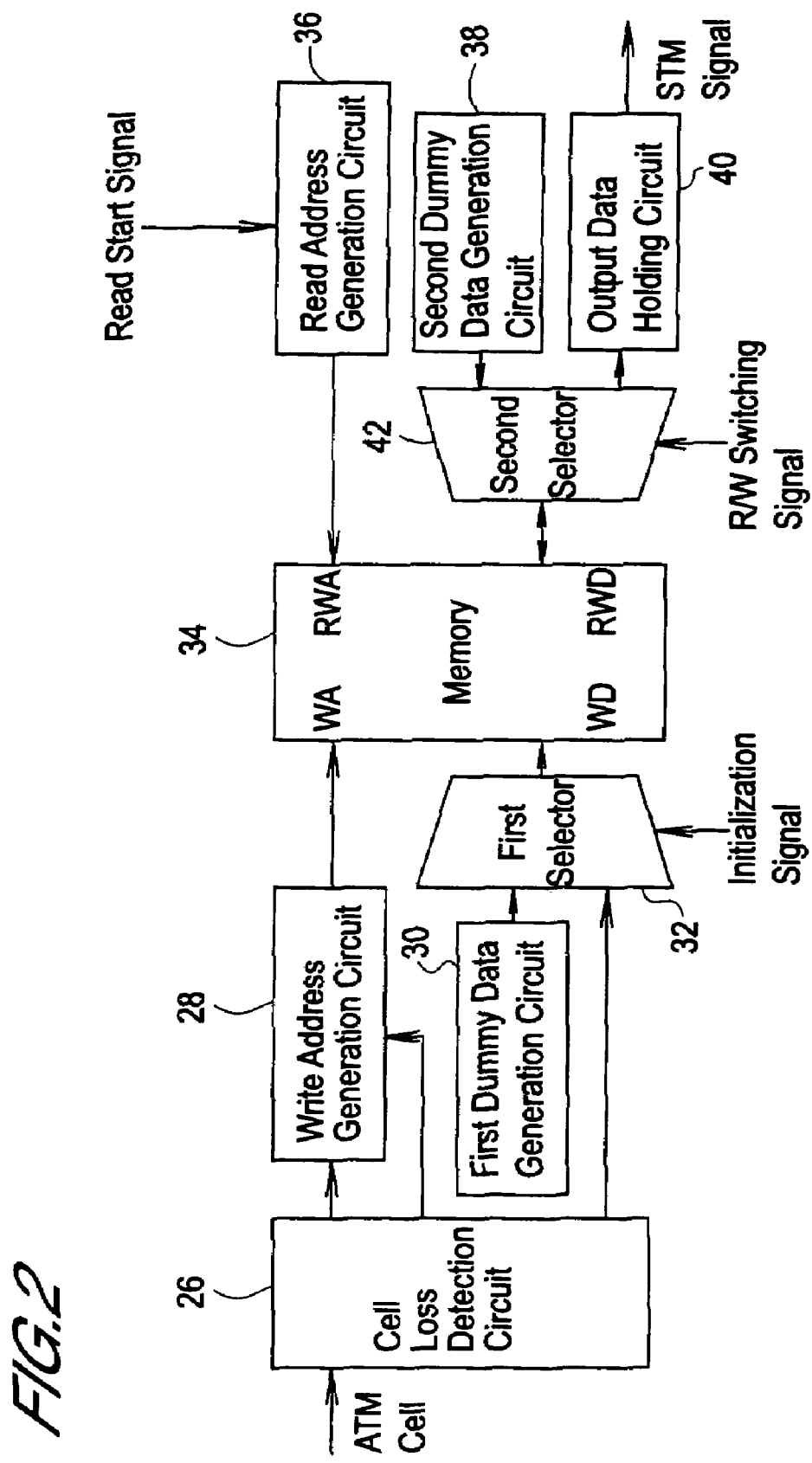

CELL DISASSEMBLY UNIT

BACKGROUND OF THE INVENTION

1. Field of the Invention

The present invention relates to a cell disassembly unit for returning signals in ATM cell format, which have been converted from the signals in an existing STM network, back to the signals in the existing STM network again in the transmission and switching equipment, based on the ATM transmission system, which is a key technology of B-ISDN.

2. Description of Related Art

The cell assembly unit is equipment for assembling the time slots of a connection (call, path) which subscribers use in an STM (Synchronous Transfer Mode) network into a cell for each connection. A cell disassembly unit, on the other hand, is equipment which performs an operation the opposite of a cell assembly unit. In other words, a cell disassembly unit is equipment for disassembling a cell in ATM (Asynchronous Transfer Mode) into time slots (bytes) so as to convert into signals of an STM network. A cell disassembly unit constitutes a part of CLAD (Cell Assembly and Disassembly).

In an ATM network, however, cells may be lost for such reasons as a miss in the transfer of cells due to bit errors or discarding of cells at a switching section, and when a cell generated by a cell assembly unit is lost, the time required for data seems to decrease if cells to arrive are simply disassembled in sequence, since the original data (STM signals) is data with a fixed speed.

For example, normal voice data is sampled at 8 kHz when digitized. Since 1 sample is 1 byte, 8000 bytes of voice data are generated in one second, which means 80000 bytes in 10 seconds.

Since 8000 bytes of voice data are generated per second at this fixed speed, the side which reproduces voice must process data at the speed of 8000 bytes per second. If the sending side (generating side) transmits data for 10 seconds (80000 bytes), the reproducing side also completes reproduction for 10 seconds. In this case, there is no difference in the processing time between the generating side and the reproducing side.

Now it is assumed that 10 seconds of data, that is, 80000 bytes of data for example, generated by the generating side is partially lost during transmission, and only 72000 bytes of data arrive at the reproducing side. The reproducing side, which does not know that data is missing, sequentially processes the arrived signals at 8000 bytes per second. Here the reproducing time takes only 9 seconds. Generation time which originally took 10 seconds is reproduced in 9 seconds, where the time required for the data seems to have decreased.

If the lost data is not compensated for, then the time difference between the generating side and the reproducing side increases infinitely, and theoretically the data is reproduced faster than the time it took for generation. This is, of course, impossible, so the system breaks down if such a time difference increases.

When cell loss occurs in an ATM network, if the receiving side simply dissembles the arrived cells, then the position of the data on the time axis changes, and data space seems to decrease. For example, it is assumed that data sent at the fifth second is lost during the transmission in the above mentioned case. In this case, at the reproducing side, the data at the sixth second comes next to the data at the fourth second. Therefore at the reproducing side, data at the sixth second and later each shift 1 second in the data position on the time axis.

SUMMARY OF THE INVENTION

With the foregoing in view, it is an object of the present invention to provide a cell disassembly unit which can accurately reproduce the position of the data on the time axis, even if cell loss occurs in an ATM network.

According to the present invention, a cell disassembly unit for converting ATM cells into STM signals comprises a cell loss detection section, sequence number generation section, write address generation section, memory, read address generation section, sequence number confirmation section, dummy data generation section, and a selector.

The cell loss detection section disassembles the ATM cell sent from the outside into bytes, and sequentially sends the bytes after disassembly to memory, and also detects the loss of ATM cells.

The sequence number generation section generates sequence numbers which change by 1 each time if there is no ATM cell loss according to the sequence of transmission of bytes, and which changes for the number of lost bytes if a loss of ATM cells occurs.

The write address generation section generates a write address for writing a set of a byte and a sequence number to the memory.

The read address generation section generates a read address for reading a set of a byte and a sequence number from the memory in the sequence of the transmission of the bytes.

The selector sends either bytes read from memory or dummy data generated by the dummy data generation section to the outside as STM signals.

The sequence number confirmation section sends bytes which were read to the selector if the sequence number, which was read from memory, has been changed by only 1 compared with the sequence number previously read, or sends bytes which were read to the selector after sending M number of bytes of the dummy data to the selector if the sequence number, which was read, has been changed by M, which is a number greater than 1, compared with the sequence number read previously.

Also according to the present invention, a cell disassembly unit with another configuration for converting ATM cells into STM signals comprises a cell loss detection section, write address generation section, first dummy data generation section, first selector, memory, read address generation section, second dummy data generation section, output data holding section, and a second selector.

The cell loss detection section disassembles the ATM cells sent from the outside into bytes, and sequentially sends the bytes after disassembly to the first selector, and also detects the loss of ATM cells.

The first selector selects either bytes read from the cell loss detection section or dummy data generated by the first dummy data generation section, and sends it to the memory.

The write address generation section generates a write address, which changes by 1 each time if there is no ATM cell loss according to the sequence of transmission of the data, and which changes for the number of lost bytes if the loss of ATM cells occurs so as to write data to the memory.

The read address generation section generates a read address for reading the data in the sequence of addresses from the memory.

The second selector sends the data read from the memory to the output data holding section, then sends the dummy data generated by the second dummy data generation section to the memory.

The output data holding section holds the data read from the memory for a predetermined period, then sends the data to the outside as STM signals.

When cell loss occurs in an ATM network, the dummy data is inserted for the amount of loss, so the position of the data on the time axis is accurately reproduced.

In the case of the above example, if dummy data is inserted for a lost 8000 bytes, then processing ends in 10 seconds at the reproducing side, just like at the generating side. In other words, the time required for data generation at the generating side becomes the same as the time required for data reproduction at the reproducing side. By compensating for the lost data in this way, a spread of the time difference between the generating side and the reproducing side can be prevented.

BRIEF DESCRIPTION OF THE DRAWINGS

The foregoing and other objects, features and advantages of the present invention will be better understood from the following description taken in connection with the accompanying drawings, in which:

FIG. 2 is a block diagram depicting the configuration of the cell disassembly unit according to the second embodiment of the present invention.

DESCRIPTION OF THE PREFERRED EMBODIMENTS

Figure 1:
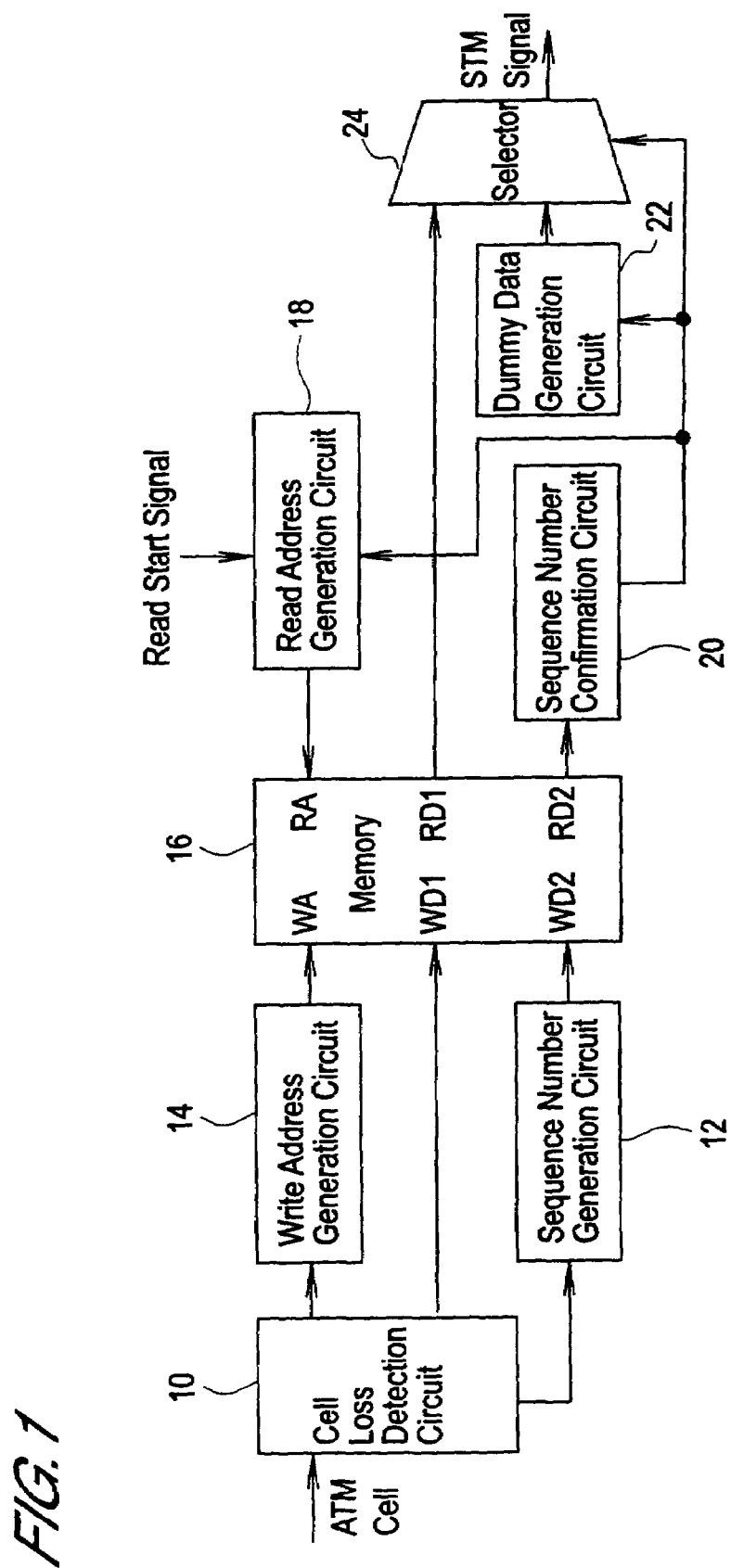
FIG. 1 is a block diagram depicting the configuration of the cell disassembly unit according to the first embodiment of the present invention.

Embodiments of the present invention will now be described with reference to the accompanying drawings. The drawings show the general connection relationships and other information only to assist in understanding the present invention. Therefore the present invention is not restricted by the examples shown in the drawings.

First Embodiment

FIG. 1 is a block diagram depicting the configuration of the cell disassembly unit of the first embodiment. This cell disassembly unit is comprised of a cell loss detection circuit 10, sequence number generation circuit 12, write address generation circuit 14, memory 16, read address generation circuit 18, sequence number confirmation circuit 20, dummy data generation circuit 22, and a selector 24.

The cell loss detection circuit 10 disassembles ATM cells sent from the outside (ATM network) into bytes. The cell loss detection circuit 10 sequentially sends the bytes after disassembly to the memory 16. The bytes are input to a first write port WD1 of the memory 16. The cell loss detection circuit 10 also detects the loss of the ATM cells and transfers the detection result to the sequence number generation circuit 12. In other words, if there is no loss of cells, the cell loss detection circuit 10 conveys this information to the sequence number generation circuit 12 as no cell loss information. If cell loss occurs, the cell loss detection circuit 10 conveys the number of lost bytes M (M is an integer) to the sequence number generation circuit 12 as a number of lost bytes signal.

The sequence number generation circuit 12 generates a sequence number N (N is an integer) in the sequence of the transmission of bytes which are sent from the cell loss detection circuit 10. The sequence number generation circuit 12 changes the sequence number N by 1 each time no cell loss information is received from the cell loss detection circuit 10. For example, the sequence number generation circuit 12 changes the sequence number N according to the following formula (1). The sequence number generation circuit 12 changes the sequence number N for the number of lost bytes M if the number of lost bytes signal is received from the cell loss detection circuit 10. For example, the sequence number generation circuit 12 changes the sequence number N according to the following formula (2). The sequence number N sent from the sequence number generation circuit 12 is input to the second write port WD2 of the memory 16.

$$N=N+1 \quad (1)$$

$$N=N+M \quad (2)$$

The write address generation circuit 14 starts generating a write address when a write start signal is received from the cell loss detection circuit 10. This write start signal is generated when the disassembly of ATM cells into bytes starts. The write address is input to the write address port WA of the memory 16. In the address specified by this write address, bytes sent from the cell loss detection circuit 10 and the sequence number N sent from the sequence number generation circuit 12 are written as a set. Therefore the write address is generated synchronizing with the output of the bytes. And the write address is sequentially incremented by 1.

If bytes do not exist due to a loss of cells, then no bytes are output from the cell loss detection circuit, and no bytes are written to the memory 16. Therefore when a cell is lost, the first byte of the cell next to the lost cell is written to the write address next to the write address of the final byte of the previous cell, along with the sequence number (N+M) given by the above formula (2).

In the memory 16, different data can be stored in the same address for the amount of the width of the data bus. For example, when the sequence number is 8 bits and the data becomes 16 bits when the sequence number and the bytes (after an ATM cell is disassembled) are added, the sequence number and the bytes can be stored in the same address if the memory has a 16 bit width.

The read address generation circuit 18 generates the read address when the read signal is received from a system outside (not shown in drawings).

The read address is input to the read address port RA of the memory 16. And the read address is sequentially incremented by 1. The bytes and the sequence number N stored in an address specified by this read address are read from the memory 16. The bytes are read from the first read port RD1 of the memory 16, and are sent to the selector 24. The sequence number N is read from the second read port RD2 of the memory 16, and is sent to the sequence number confirmation circuit 20.

The selector 24 sends either the bytes read from the memory 16 or the dummy data generated by the dummy data generation circuit 22 to the outside (STM network) as STM signals. Either the bytes or the dummy data is selected according to the dummy data insertion signal sent from the sequence number configuration circuit 20.

The sequence number confirmation circuit 20 checks the continuity of the sequence number N read from the memory 16. If the sequence number N has jumped as a result of this continuity check, then the sequence number confirmation circuit 20 sends the dummy data insertion signal to the read address generation circuit 18 and the selector 24. In other words, the sequence number confirmation circuit 20 does not output the dummy data insertion signal if the sequence number (N1) read from the memory 16 has been changed by 1 compared with the sequence number (N0) which was read previously. In this case, the read address generation circuit 18 continues incrementing the read address, and the selector 24 sends the bytes read from the memory 16 to the outside.

If the sequence number N1 read from the memory 16 has been changed by a number M greater than 1 compared with the sequence number N0 which was read previously, on the other hand, the sequence number confirmation circuit 20 outputs a dummy data insertion signal. This dummy data insertion signal is sent to the selector 24, the read address generation circuit 18, and the dummy data generation circuit 22. In this case, the bytes read along with the sequence number N1 are not sent to the selector 24, but are held in the memory 16. And incremention of the read address is interrupted in the read address generation circuit 18. During this interruption, the dummy data generation circuit 22 starts generating an M number of bytes of dummy data. Therefore the selector 24 sends the M number of bytes of dummy data generated by the dummy data generation circuit 22 to the outside. After the M number of bytes of dummy data is sent from the selector 24, the sequence number confirmation circuit 20 receives the dummy data transmission complete signal, and stops the output of the dummy data insertion signal. In response to this, incremention of the read address restarts in the read address generation circuit 18, and bytes read from the memory 16 along with the sequence number N1 are sent from the selector 24 to the outside.

The sequence number confirmation circuit 20 holds the previous number N0 which was input just before the newly input sequence number N1, and confirms the continuity of the sequence number N by comparing the sequence numbers N1 and N0.

Now the operation of the cell disassembly unit according to the first embodiment will be described.

In an ATM network, cellularization is performed in an AAL1 format (see ITU-T I.363.1), for example, so that the receiving side knows of a loss of cells if cell loss occurs. In this format, a sequence number is added to the first byte (sixth byte from the beginning of a cell) of the payload of a cell. Therefore when cell loss occurs, the number of lost cells can be known by detecting a jump in the sequence numbers.

When ATM cells are input, the cell loss detection circuit 10 detects the number of cells lost in the ATM network by the above mentioned method, for example. And based on the number of lost cells and the number of bytes included in the cells, the cell loss detection circuit 10 calculates the total number of bytes lost. The number of bytes included in a cell is a maximum of 47 bytes in the case of the above mentioned AAL1 format cell, since 1 byte out of a 48 byte payload is used for the sequence number. The cell loss detection circuit 10 sends the calculation result of the number of lost bytes to the sequence number generation circuit 12, at the timing of the writing of the bytes, as the number of lost bytes signal. When a cell is disassembled, the cell loss detection circuit 10 sends the write start signal to the write address generation circuit 14. The cell loss detection circuit 10 disassembles the input ATM cell into bytes, and sends the bytes after disassembly to the memory 16.

When there is no cell loss, the sequence number generation circuit 12 generates the normal sequence number N=N+1, and writes this sequence number to the memory 16 at an address the same as the byte (STM signal) to be written in the memory 16. When the number of lost bytes signal is received from the cell loss detection circuit 10, the sequence number generation circuit 12 generates the sequence number N=N+ as the number of lost bytes. This sequence number is written to the memory 16 along with the bytes which were written first to the memory 16 after the cell loss is generated. Then the sequence number generation circuit 12 repeats the calculation N=N+1 as long as the number of lost bytes signal is not received. The sequence number is written to the memory 16 along with the bytes.

When the write start signal is received from the cell loss detection circuit 10, the write address generation circuit 14 generates a write address for writing the byte and sequence number to the memory 16. The address is incremented by 1 as usual, even if a cell loss occurs. Therefore, the data (bytes and sequence number) is continuously stored in the memory space even if a cell loss occurs.

Since ATM cells are usually used for packet communication, the input timing of each cell is discrete. STM signals, on the other hand, are continuous signals with a predetermined transmission speed. The data transmission speed is adjusted by the memory 16.

The above mentioned system (not shown in drawing) monitors the volume of the data stored in the memory 16, and generates the read start signal when the volume exceeds the threshold value, which is set from the outside, for example. When the read start signal is received from the above mentioned system, the read address generation circuit 18 starts generating a read address to read data from the memory 16. Then the read address generation circuit 18 increments the address according to a predetermined read speed. Since the reading side is an STM network, the read address generation circuit 18 normally continues generating addresses at a predetermined read speed once reading is started. However, when the dummy data insertion signal is received from the sequence number confirmation circuit 20, the read address generation circuit 18 stops incrementing addresses.

The sequence number confirmation circuit 20 monitors the sequence number read from the memory 16 by the read address, and while the sequence numbers are continuous, the sequence number confirmation circuit 20 controls the selector 24 so that the STM signal (byte) read from the memory 16 is selected and output. If the sequence number jumps, on the other hand, the sequence number confirmation circuit 20 outputs the dummy data insertion signal, has the read address generation circuit 18 stop generating read addresses, and controls the selector 24 to output the dummy data. When the jumped sequence number is S and the previous sequence number is N, the sequence number confirmation circuit 20 repeats the operation N=N+1 according to the above read speed, and cancels the dummy data insertion signal when the operation results becomes N=S. The jumped sequence number S is for example, 5 when the sequence is 1, 2, 3, 5, 6.

The dummy data generation circuit 22 is a circuit to generate dummy data suitable for the STM network at the output side, and generates signals such that all data become "1" in binary notation, for example. In the case of voice data, for example, noise is generated. And the generated signal is always output to the selector 24.

The selector 24, which is controlled by the sequence number confirmation circuit 20, selects a signal from the dummy data generation circuit 22 while the dummy data signal is being input, and selects and outputs the STM signals from the memory 16 in other cases.

As described above, the cell disassembly unit according to the first embodiment has a configuration to write the byte and a sequence number simultaneously to the memory 16, and if a cell loss occurs in an ATM network, the lost number of bytes is added to the sequence number. Since the reading side monitors the sequence number, the number of bytes of dummy data to be inserted is known. Dummy data is inserted for the amount of loss, so that the time phase of the STM signal normally received becomes the same as the case when a cell loss did not occur.

The STM signal to be output from the cell disassembly unit becomes incomplete data if cell loss occurs. As mentioned above, noise is inserted where the loss occurred in the case of voice data, for example. Still the above mentioned dummy data insertion processing is required to match the generating side and the reproducing side. Also in the case of the AAL1 cell format, structured cells can be handled. The first position of data is indicated by a pointer included in a header called the "AAL1 header" when repeat data (different length from the length of the payload of a cell) with a fixed length is stored in a cell. Since the first position is specified by a pointer, the first position becomes unknown if data is lost in the middle of a transmission, and reproduction becomes impossible. To prevent this, dummy data must be inserted to eliminate the time inconsistency between the generating side and the reproducing side.

Second Embodiment

FIG. 2 is a block diagram depicting the configuration of the cell disassembly unit according to the second embodiment. This cell disassembly unit is comprised of a cell loss detection circuit 26, write address generation circuit 28, first dummy data generation circuit 30, first selector 32, memory 34, read address generation circuit 36, second dummy data generation circuit 38, output data holding circuit 40, and second selector 42.

The cell loss detection circuit 26 disassembles ATM cells sent from the outside (ATM network) into bytes. The cell loss detection circuit 26 sequentially sends the bytes after disassembly to the first selector 32. The cell loss detection circuit 26 also detects the loss of ATM cells and transfers the detection result to the write address generation circuit 28. In other words, if there is no loss of cells, the cell loss detection circuit 26 transfers this state to the write address generation circuit 28 as no cell loss information. If loss of cells is detected, the cell loss detection circuit 26 transfers the number of lost bytes M (M is an integer) to the write address generation circuit 28 as a number of lost bytes signal.

The first selector 32 selects either the bytes read from the cell loss detection circuit 26 or the dummy data generated by the first dummy data generation circuit 30, and sends the data to the memory 34. Either the bytes or the dummy data is selected according to the initialization signal sent from the initialization signal generation circuit, which is not shown in the drawing. The data output from the first selector 32 is input to the data write port WD of the memory 34.

The write address generation circuit 28 generates a write address when a write start signal is received from the cell loss detection circuit 26. This write address is input to the write address port WA of the memory 34. Data selected by the first selector 32 is written to the address specified by this write address. Therefore the write address is generated synchronizing with the output timing of the data which is output from the first selector 32. The write address generation circuit 28 changes the write address by 1 each time in the sequence of the transmission of the data if there is no loss of ATM cells. For example, the write address generation circuit 28 changes the write address according to the following formula (3). The write address generation circuit 28, on the other hand, changes the write address for the number of lost bytes M when the number of lost bytes signal is received from the cell loss detection circuit 26. For example, the write address generation circuit 28 changes the write address according to the following formula (4).

$$N = N+1 \quad (3)$$

$$N = N+M \quad (4)$$

The read address generation circuit 36 generates a read address when a read start signal is received from a system outside (not shown in the drawing). The read address is input to a read/write address port RWA of the memory 34. The bytes or dummy data stored in the address specified by this read address is read from the memory 34. The read address is sequentially incremented by 1. Therefore the data is read from the memory 34 in the sequence of addresses. The data is read from the read/write address port RWD of the memory 34, and is sent to the second selector 42.

The second selector 42 sends the data read from the memory 34 to the output data holding circuit 40, then sends the dummy data generated by the second dummy data generation circuit 38 to the memory 34. This operation is switched according to the R/W switching signal sent from the R/W switching signal generation circuit, which is not shown in the drawing. In other words, when the second selector 42 reads the data from the memory 34, the second selector 42 writes the dummy data to the address where the read data had been stored. Therefore, at the reading side of the memory 34, access is at a speed double the normal transmission speed of the STM network, where reading and writing are executed alternately.

The output data holding circuit 40 holds the data read from the memory 34 for a predetermined period, then sends this data to the outside (STM network) as STM signals. As mentioned above, data sent from the second selector 42 is sent at a speed double the original speed of the STM network, so the output data holding circuit 40 holds data for a predetermined period, so as to stretch the data to the speed (x1) of the STM network.

Now the operation of the cell disassembly unit according to the second embodiment will be described.

The memory 34 is initialized when the system starts up. At first, an initialization signal is input to the first selector 32. The first selector 32 selects the dummy data generated by the first dummy data generation circuit 30 according to the initialization signal, and outputs it to the memory 34. The write address generation circuit 28 sequentially generates addresses for the entire address space of the memory 34 at the output timing of the dummy data to be output from the first selector 32. As a result, all content stored in the memory 34 becomes dummy data.

After initialization, the cell disassembly unit operates according to the following procedure.

First the cell loss detection circuit 26 disassembles cells and detects loss of cells. A cell is disassembled into bytes and is sent to the first selector 32. The procedure of detecting loss of cells by the cell loss detection circuit 26 is the same as the procedure described in the first embodiment, so descriptions here are omitted. The cell loss detection circuit 26 detects loss of cells, then outputs the number of lost bytes signal to the write address generation circuit 28.

The first selector 32 selects dummy data only at initialization. Thereafter, however, the first selector 32 selects the STM signals (bytes) after disassembly by the cell loss detection circuit 26, and outputs the STM signals to the memory 34.

The write address generation circuit 28 generates write addresses to all the address of the memory 34 at initialization, and sends the write addresses to the memory 34. When a write start signal is received from the cell loss detection circuit 26, the write address generation circuit 28 generates a write address for writing the STM signal to the memory 34, and outputs it to the memory 34. When the number of lost bytes is input from the cell loss detection circuit 26 at this time, the write address generation circuit 28 generates an address by adding the number of lost bytes to the write address. And the write address generation circuit 28 hereafter generates addresses sequentially incremented from this address where the number of lost bytes is added.

Dummy data is written in all the areas of the memory 34 at initialization. Then after ATM cells arrive, the STM signals selected by the first selector 32 are written to the write address specified by the write address generation circuit 28. At the reading side, the data in the memory 34 is read according to the read address generated by the read address generation circuit 36. During reading, the memory 34 is accessed at a speed double the normal speed of the STM network. And reading and writing are repeated alternately. Reading and writing are regarded as a pair, and the addresses of this pair are the addresses specified by the read address generation circuit 36. In other words, dummy data selected by the second selector 42 is written to an address which is the same as the address when data was read immediately after reading.

The read address generation circuit 36 generates the read address at the speed of the STM network, and outputs the read address to the memory 34. The read address generation circuit 36 generates read addresses which are incremented by 1 each time after reading starts.

The second dummy data generation circuit 38 generates dummy data the same as the first dummy data generation circuit 30, and continues outputting dummy data to the second selector 42.

The second selector 42 switches between the read operation and the write operation according to the R/W switching signal. The second selector 42 selects the output signal from the memory 34 at reading, and outputs it to the output data holding circuit 40. The second selector 42 selects dummy data from the second dummy data generation circuit 38 at writing, and outputs it to the memory 34.

Data which is output from the second selector 42 is output at a speed double the original speed of the STM network. Therefore the output data holding circuit 40 holds the data so as to stretch the data from the second selector 42 to the speed of the STM network (x1), and outputs the data to the outside (STM network) at the speed of the STM network.

As described above, according to the cell disassembly unit of the second embodiment, dummy data is written in all areas of the memory 34, except in areas where normal STM signals are stored. Therefore, it is sufficient that the writing side processes lost cells, and the reading side can merely read the data of the memory 34 sequentially without being influenced by loss of cells. Just as in the first embodiment, dummy data is inserted for lost cells, so the time based phase of the STM signals, which were received normally, can be the same as the case when no cell loss occurs.

For the first and second embodiments, the cell disassembly unit is integrated for one connection of the ATM network, but a similar circuit (the cell disassembly unit) can be integrated for a plurality of connections respectively.

The cell loss detection method is not restricted to the method described for the embodiments, but may be another method if the method can determine the number of lost cells.

In all of the above mentioned cell disassembly units of the present invention, dummy data is inserted for lost cells when cell loss occurs in the ATM network, so the position of data on the time axis can be accurately reproduced.

What is claimed is:

1. A cell disassembly unit for converting ATM cells into STM signals, comprising a cell loss detection section, write address generation section, first dummy data generation section, first selector, memory, read address generation section, second dummy data generation section, output data holding section and a second selector, wherein:

said cell loss detection section disassembles said ATM cells sent from the outside into bytes, and sequentially sends said bytes after disassembly to said first selector, and also detects the loss of said ATM cells;

said first selector selects either said bytes read from said cell loss detection section or dummy data generated by said first dummy data generation section and sends the selected data to said memory;

said write address generation section generates a write address which changes by a predetermined number each time if there is no ATM cell loss according to the sequence of the transmission of said data, and which changes for the number of lost bytes if the loss of said ATM cells occurs, in order to write said data to said memory;

said read address generation section generates a read address for reading said data in the sequence of addresses from said memory;

said second selector sends said data read from said memory to said output data holding section, then sends the dummy data generated by said second dummy data generation section to said memory, and said output data holding section holds said data read from said memory for a predetermined period, then sends said data to a STM network as said STM signals.

2. A cell disassembly unit of claim 1, wherein the predetermined number is 1.

* * * * *